Patented Mar. 1, 1949

2,463,324

UNITED STATES PATENT OFFICE 2,463,324

SESAME EXTRACT SYNERGIZED INSECTICIDES

William A. Simanton, Oakmont, Pa., assignor to Gulf Research & Development Company, Pittsburgh, Pa., a corporation of Delaware No Drawing. Application January 3, 1944, Serial No. 516,847

5 Claims. (Cl. 167—24)

This invention relates to improvements in insecticides and it is particularly concerned with improvements in insecticides containing insect toxins of plant origin such as pyrethrins, rotenone and the like.

Solutions of pyrethrins, rotenone and similar plant toxins in petroleum fractions are used extensively as household insect and livestock sprays. Such solutions may be prepared, for example, by extraction of pyrethrum flowers with a petroleum naphtha. These insecticides also often contain mixtures of pyrethrins with rotenone or other plant toxins. By the term plant toxin insecticides as used herein and in the appended claims I mean to include insecticides containing pyrethrins, rotenone or other related plant toxins, or mixtures thereof, with or without other added insecticidal materials.

It has recently been found that sesame oil, when added to insecticides containing pyrethrins, rotenone and the like, acts as a synergist to promote the killing power or activity of the insect toxin present in the insecticide. The sesame oil itself has little or no insecticidal power but when combined with pyrethrins, rotenone or like plant extracts it acts to increase their toxicity. Thus, by the use of small proportions of sesame oil in pyrethrin-containing insecticides, the concentration of pyrethrins and other toxins necessary to produce an insecticide of given toxicity can be reduced.

It is an object achieved by the present invention to provide an improved synergistic agent for plant toxin insecticides comprising sesamin and other synergistically active components of sesame oil, and having a greater total synergistic effect than the sesame oil from which it is produced. It is also an object achieved by the present invention to provide an improved synergistic agent for plant toxin insecticides comprising the sesame oil components soluble in low molecular weight alcohols.

A further object of this invention is to provide a process for the production of an improved synergistic agent for plant toxin insecticides comprising separating the synergistically active component from sesame oil without substantial destruction of their synergistic activity by extracting from the sesame oil up to about 8 per cent by weight of its lowest molecular weight components by treatment with a low molecular weight alcohol solvent.

It is also an object of this invention to provide a process for the production of greater quantities of plant toxin insecticides of a given toxicity from a given quantity of plant toxin, particularly pyrethrins, and sesame oil than has heretofore been possible.

I have discovered that by the use of suitable recovery processes synergistically active products comprising a plurality of synergistic components may be produced from sesame oil. These products have a total synergistic activity greater than that of the original sesame oil and when they are incorporated in plant toxin insecticides, a greater quantity of insecticides of a given toxicity can be produced than was heretofore obtainable from a corresponding amount of plant toxin, particularly pyrethrin, and sesame oil.

In carrying out the method of my invention I effect a separation of a part or all of the synergistically active materials from the fatty portions of the sesame oil in such manner that no substantial part of the synergistic materials is destroyed and no substantial part of their synergistic activity is impaired. I have found that sesamin and other synergistic materials contained in the sesame oil are relatively easily decomposed by heat and that when they are separated from the oil in such manner that they are not substantially decomposed by heating or otherwise, the products recovered have a total synergistic activity greater than the original sesame oil.

The method which I have found particularly suitable for separation of the synergistic components from sesame oil without substantial decomposition is to extract the sesame oil with a low molecular weight solvent which may subsequently be separated from the extracted products by distillation under temperature and time conditions less severe than those at which decomposition of the extracted components takes place to a substantial degree. For this purpose I have found that extraction of the sesame oil with low molecular weight alcoholic solvents produces good results. The synergistically active components of the sesame oil I have found are among the lower molecular weight components of the oil and are substantially soluble in low molecular weight alcoholic solvents. However, the higher fatty components also have substantial solubilities in some alcohol solvents. It is desirable, therefore, in selecting the low molecular weight solvent to be used, to choose one having a low solvent action on the fatty component of sesame oil. For this purpose I have found the lower alcohols such as methanol, ethanol, ethylene glycol monomethyl ether and mixtures of these alcohols with ketones such as acetone, methyl ethyl ketone, mesityl oxide and the like are particularly suitable solvents and by the term alcoholic solvents as used herein and in the appended claims I mean to include not only alcohols but their mixtures with ketones and other organic solvents. These alcoholic solvents act selectively to extract the low molecular weight synergistically active components from the sesame oil and are readily separated from the extracted products by distillation at low temperatures so that little or no synergistic activity is lost.

The amount of synergistically active material present in sesame oil varies somewhat with the source of the oil. In general I have found, however, that by extracting from the oil its lowest molecular weight components in an amount corresponding to about 8.0 per cent by weight of the oil, the residual oil has substantially no synergistic effect, indicating a complete removal of the synergistic components. The resulting extract has a higher synergistic effect than the original oil. In carrying out my invention, however, it is not necessary to recover all of the synergistic material from the oil. When only part of the synergistic material is recovered the residual oil retains some synergistic properties, and the extract and residual oil together have a synergistic effect greater than the original sesame oil. Thus, in carrying out my invention improved synergistic effects can be obtained by extracting the lowest molecular weight components of the oil in amounts up to about 8.0 per cent by weight of the oil.

The solvent extraction of the sesame oil may be carried out according to my invention either as a batch or a continuous operation. When a batch operation is used it is generally desirable to extract the oil several times with an amount of solvent at least about equal to the amount of oil treated and combine the extracts before distilling off the solvent. This extraction is advantageously carried out at a moderate temperature somewhat above room temperature and below the boiling point of the solvent. These moderate temperatures are particularly advantageous in continuous operation to prevent emulsification of the oil with the solvent. In continuous countercurrent flow extraction, good results have been obtained at temperatures of 120° to 130° F. using ratios of solvent to oil of two or three to one.

After distilling off the solvent from the extract the product recovered is an oily material, fluid at 125° F., which on cooling and standing form brownish crystals mixed with the oil. A crystalline compound having properties corresponding to the properties of sesamin is recoverable from this extraction product. Also a second crystalline compound having a melting point of 92° C. and having high synergistic activity can be separated. The oily fraction of the product contains some dissolved sesamin and a non-crystalline synergistically active component. Both the crystalline and oily products thus recovered have higher synergistic activity when incorporated in plant toxin insecticides than the original sesame oil. The raffinate oil from the extraction process may retain some synergistic activity if the extraction of the synergistic components is not carried to completion, and it may be used also as a synergistic additive for insecticides. In such case the synergistic products have a combined activating effect greater than that of the original sesame oil. On the other hand, by extensive extraction, the greater part of the synergistic components of the sesame oil can be separated. The raffinate oil thus obtained is suitable for use as an edible oil or for industrial purposes.

The synergistic products recovered by treatment of sesame oil according to my invention may be incorporated in plant toxin insecticides in suitable concentration, depending upon their potency. Sesame oil itself is customarily used in pyrethrin insecticides in concentrations of 0.5 to 5.0 per cent. More than 5.0 per cent of sesame oil does not produce any substantially greater activating effect on the pyrethrin than 5.0 per cent. Amounts of sesame oil greater than 0.5 per cent added to an insecticide such as a pyrethrin fly-spray tend to impart to the spray oiliness which causes such sprays to stain wallpaper and the like. For this reason it has heretofore been impossible to take advantage of the full synergistic effect of sesame oil in such fly-sprays, while avoiding staining properties. By using the extracted synergistic materials produced according to my invention non-staining fly-sprays of greater potency can be produced. As little as 0.1 gram of the synergistically active concentrate per 100 ml. of a pyrethrin insecticide containing 50 mg. of pyrethrins per 100 ml. can produce a fly-spray having a Peet-Grady kill rating of +10 in comparison with the Official Test Insecticide. The raffinate portion of the products obtained according to my invention, when it retains any synergistic activity, is usually substantially less potent than the original sesame oil and is more useful as a synergistic addition for cattle-sprays and the like in which the question of oiliness and staining is not important and relatively large concentrations of the raffinate may be used without deleterious effect.

In the following specific examples there are illustrated the advantages obtained by extracting sesame oil according to the method of my invention. In these examples, as in other tests upon which this invention is based, evaluations were made by the official Peet-Grady Method of the National Association of Insecticide and Disinfectant Manufacturers as described in Soap Blue Book, 1942 (MacNair-Dorland Company, New York). Comparisons were made with the Official Test Insecticide (O. T. I.).

*Example 1.*—A quantity of commercial sesame oil was agitated four successive times with equal volumes of absolute methanol. The four extracts obtained were combined and the alcohol was removed by distillation. An oily product corresponding to 6.24 per cent by weight of the original sesame oil was thus obtained. The raffinate corresponded to 91.7 per cent by weight of the original sesame oil. The synergistic effects of the commercial sesame oil, the oily extract and the raffinate were compared by incorporating in separate quantities of a pyrethrin insecticide consisting of a solution of 50 mg. of pyrethrins per 100 ml. of light deodorized mineral oil, an amount of each sufficient to produce an insecticide having an O. T. I. kill rating of +10. The following results were obtained: The pyrethrin insecticide used as a base had a Peet-Grady kill of 27.5 per cent dead at 24 hours and an O. T. I. kill rating of −12.5. When 1.9 ml. of the commercial sesame oil were added per 100 ml. of the base insecticide, an insecticide having a Peet-Grady kill of 50 per cent dead at 24 hours and an O. T. I. kill rating of +10 was obtained. When 0.1 gram of the oily extract recovered after separation of the methanol was added per 100 ml. of the insecticide, a product having a Peet-Grady kill of 50 per cent dead at 24 hours and an O. T. I. kill rating of +10 was obtained. When 2.2 ml. of the raffinate were added per 100 ml. of the base insecticide, a product having a Peet-Grady kill of 50 per cent dead at 24 hours and an O. T. I. kill rating of +10 was obtained. From these data it was calculated that about 100 ml. of the commercial sesame oil when used in concentrations of 1.9 per cent in the above pyrethrin insecticide would give 5240 ml. of insecticide having a +10 kill rating. The oily extract, however, will give 5730 ml. of an insecticide of the same kill power. Also, the raffinate will give 4180 ml. of an insecticide having a +10 kill rating. The total amount of insecticide having a kill rating of +10 obtainable from the synergistic products of the process of this invention is 9910 ml. It will be seen, therefore, that by the process of the present invention, 89.2 per cent more insecticide of specified toxicity was obtained over that obtainable by use of the original sesame oil.

*Example 2.*—In this example commercial sesame oil was agitated eight successive times with equal volumes of absolute methanol. The methanol extracts were combined and the alcohol was removed by distillation. An oily extract corresponding to 9.7 per cent by weight of the original sesame oil was obtained. The raffinate corresponded to 89.2 per cent by weight of the original sesame oil. The synergistic effect of the oily extract, the raffinate and the commercial sesame oil were tested as in Example 1 by compounding them with an insecticide containing 50 mgs. of pyrethrin per 100 ml. of oil, in an amount sufficient to produce an insecticide having an O. T. I. kill rating of +10. From the data thus obtained it was determined that 100 ml. of the commercial sesame oil, when used in concentrations of 1.7 per cent by volume would make 5880 mls. of an insecticide having an O. T. I. kill rating of +10. The oily extract when used at concentrations of 0.1 gram per 100 ml. would produce about 8927 ml. of an insecticide having a +10 kill rating. The raffinate, when used at concentrations of about 7 per cent by volume would produce about 1277 ml. of insecticide having a +10 kill rating. Thus an increase of 4324 ml. of insecticide having a +10 kill rating, equivalent to an increase of 73.5 per cent, is obtainable from the synergistically active products produced according to the process of my invention, over the amount obtainable from the original sesame oil.

In the following claims the term "thermally undecomposed low molecular weight alcohol extracted sesame oil components" refers to the herein described synergistically active sesame oil components extracted from sesame oil by low molecular weight alcohols at a temperature below that at which said components decompose to lose their synergistic activity.

While the invention has been described herein in connection with certain embodiments thereof, it is to be understood that the invention is not limited by the details of such embodiments except as hereinafter defined in the appended claims.

What I claim is:

1. An insecticidal composition essentially comprising an insect toxicant selected from the group consisting of pyrethrins and rotenone, and, in an amount sufficient to synergistically increase the insecticidal activity of said insect toxicant, a mixture of thermally undecomposed low molecular weight alcohol extracted sesame oil components prepared by extracting sesame oil with a low molecular weight alcohol to remove about 6 to about 10 per cent by weight of said oil in an extract phase, and removing said alcohol from said extract phase at a temperature below the thermal decomposition temperature of the extracted components of said oil.

2. An insecticidal composition essentially comprising an insect toxicant selected from the group consisting of pyrethrins and rotenone, and, in an amount sufficient to synergistically increase the insecticidal activity of said toxicant, thermally undecomposed methanol extracted sesame oil components prepared by extracting sesame oil with methanol to remove about 6 to about 10 per cent by weight of said oil in an extract phase, and removing said methanol from said extract phase at a temperature below the thermal decomposition temperature of the extracted components of said oil.

3. An insecticidal composition essentially comprising pyrethrins, and, in an amount sufficient to synergistically increase the insecticidal activity of said pyrethrins, thermally undecomposed methanol extracted sesame oil components prepared by extracting sesame oil with methanol to remove about 6 to about 10 per cent by weight of said oil in an extract phase, and removing said methanol from said extract phase at a temperature below the thermal decomposition temperature of the extracted components of said oil.

4. An insecticidal composition essentially comprising a light mineral oil solution of pyrethrins, and, in an amount sufficient to synergistically increase the insecticidal activity of said pyrethrins, thermally undecomposed methanol extracted sesame oil components prepared by extracting sesame oil with methanol to remove about 6 to about 10 per cent by weight of said oil in an extract phase, and removing said methanol from said extract phase at a temperature below the thermal decomposition temperature of the extracted components of said oil.

5. An insecticidal composition essentially comprising a light mineral oil solution of pyrethrins containing about 50 milligrams of pyrethrins per 100 milliliters of mineral oil and a mixture of thermally undecomposed methanol extracted sesame oil components in an amount equivalent to about 0.1 gram per 100 milliliters of the mineral oil solution of pyrethrins, said mixture of thermally undecomposed methanol extracted sesame oil components being prepared by extracting sesame oil with methanol to remove about 6 to about 10 per cent by weight of said oil in an extract phase, and removing said methanol from said extract phase at a temperature below the thermal decomposition temperature of the extracted components of said oil.

WILLIAM A. SIMANTON.

REFERENCES CITED

The following references are of record in the file of this patent:

UNITED STATES PATENTS

| Number | Name | Date |
|---|---|---|
| 2,098,254 | Matill et al. | Nov. 9, 1937 |
| 2,202,145 | Eagleson | May 28, 1940 |

OTHER REFERENCES

Bruce et al., Chemical Abstracts, vol. 35, page 1518.

Haller et al., Journal of Economic Entomology, vol. 35, pages 247 and 248.

Tocher, "Further Note on Sesamin," Pharmaceutical Journal and Transactions, Feb. 23, 1893, pages 700–702; page 700 esp. pertinent.